US011942295B2

(12) United States Patent
Zhang et al.

(10) Patent No.: US 11,942,295 B2
(45) Date of Patent: Mar. 26, 2024

(54) RELAY

(71) Applicant: Tyco Electronics (Shenzhen) Co. Ltd., Shenzhen (CN)

(72) Inventors: Xiaoning Zhang, Shenzhen (CN); Teng Zou, Shenzhen (CN)

(73) Assignee: Tyco Electronics (Shenzhen) Co., Ltd., Shenzhen (CN)

( * ) Notice: Subject to any disclaimer, the term of this patent is extended or adjusted under 35 U.S.C. 154(b) by 735 days.

(21) Appl. No.: 17/066,888

(22) Filed: Oct. 9, 2020

(65) Prior Publication Data

US 2021/0027963 A1 Jan. 28, 2021

Related U.S. Application Data

(63) Continuation of application No. PCT/EP2019/059241, filed on Apr. 11, 2019.

(30) Foreign Application Priority Data

Apr. 16, 2018 (CN) ......................... 201820535621.3

(51) Int. Cl.
*H01H 50/12* (2006.01)
*H01H 50/16* (2006.01)
(Continued)

(52) U.S. Cl.
CPC .......... *H01H 50/38* (2013.01); *H01H 50/163* (2013.01); *H01H 50/20* (2013.01);
(Continued)

(58) Field of Classification Search
CPC ........ H01H 50/12; H01H 50/24; H01H 50/20; H01H 50/38; H01H 50/163; H01H 50/546;
(Continued)

(56) References Cited

U.S. PATENT DOCUMENTS 3,194,918 A 7/1965 Muscante et al.
5,416,455 A 5/1995 Moldovan et al.
(Continued)

FOREIGN PATENT DOCUMENTS

CN 207074608 U 3/2018
CN 207124166 U 3/2018
(Continued)

OTHER PUBLICATIONS

Translation of CN207074608 (Original document published Mar. 6, 2018) (Year: 2018).*
(Continued)

*Primary Examiner* — William A Bolton
(74) *Attorney, Agent, or Firm* — Barley Snyder

(57) ABSTRACT

A relay includes a housing, an electric contact system in the housing, an electromagnetic system in the housing, and a magnetic blowing arc-extinguish device. The electric contact system includes a static contact with a static contact portion and a movable contact with a movable contact portion. The electromagnetic system is configured to drive the movable contact to move between a closed position in which the movable contact is in electrical contact with the static contact and an opened position in which the movable contact is separated from the static contact. The magnetic blowing arc-extinguish device includes a permanent magnet statically provided near the static contact and configured to lengthen an electric arc between the static contact portion and the movable contact portion by an electromagnetic force to extinguish the electric arc.

44 Claims, 8 Drawing Sheets

(51) Int. Cl.

| | |
|---|---|
| ***H01H 50/20*** | (2006.01) |
| ***H01H 50/24*** | (2006.01) |
| ***H01H 50/38*** | (2006.01) |
| ***H01H 50/54*** | (2006.01) |
| ***H01H 50/64*** | (2006.01) |

(52) U.S. Cl.
CPC .......... *H01H 50/24* (2013.01); *H01H 50/546* (2013.01); *H01H 50/643* (2013.01); *H01H 50/12* (2013.01)

(58) Field of Classification Search
CPC .. H01H 50/541; H01H 50/643; H01H 50/645; H01H 9/32; H01H 1/2041
USPC ................ 218/24, 23, 22, 26, 27, 32, 34, 38
See application file for complete search history.

(56) References Cited

U.S. PATENT DOCUMENTS

| | | | | |
|---|---|---|---|---|
| 9,299,520 | B2 * | 3/2016 | Kubono | H01H 50/36 |
| 9,431,197 | B2 | 8/2016 | Engewald | |
| 9,437,376 | B2 * | 9/2016 | Mattlar | H01H 9/362 |
| 9,552,945 | B2 * | 1/2017 | Britz | H01H 9/443 |
| 9,583,291 | B2 * | 2/2017 | Kashimura | H01H 50/023 |
| 9,852,865 | B2 * | 12/2017 | Kroeker | H01H 50/22 |
| 9,859,077 | B2 * | 1/2018 | Sugisawa | H01H 50/36 |
| 2013/0240495 | A1 * | 9/2013 | Yano | H01H 9/443 219/123 |
| 2014/0246403 | A1 | 9/2014 | Engewald | |
| 2014/0346144 | A1 * | 11/2014 | Coquil | H01H 1/2041 218/26 |
| 2017/0301490 | A1 * | 10/2017 | Domejean | H01F 1/055 |

FOREIGN PATENT DOCUMENTS

| | | | |
|---|---|---|---|
| CN | 207896004 | U | 9/2018 |
| JP | 2005108768 | A | 4/2005 |
| KR | 1020140096056 | B1 | 8/2014 |

OTHER PUBLICATIONS

Translation of CN207124166 (Original document published Mar. 20, 2018) (Year: 2018).*
Korean Office Action dated Aug. 11, 2022 (with English translation thereof), corres. to Application No. 2022-060757409, 12 pages.
PCT International Search Report and Written Opinion, dated Jul. 3, 2019, 15 pages.
Abstract of CN 207074608, dated Mar. 6, 2018, 1 page.
Abstract of CN 207124166, dated Mar. 20, 2018, 1 page.
Abstract of JP 2005108768, dated Apr. 21, 2005, 1 page.
Abstract of CN 207896004, dated Sep. 21, 2018, 1 page.

* cited by examiner

RELAY

CROSS-REFERENCE TO RELATED APPLICATIONS

This application is a continuation of PCT International Application No. PCT/EP2019/059241, filed on Apr. 11, 2019, which claims priority under 35 U.S.C. § 119 to Chinese Patent Application No. 201820535621.3, filed on Apr. 16, 2018.

FIELD OF THE INVENTION

The present invention relates to a relay and, more particularly, to a relay having an arc-extinguishing device.

BACKGROUND

An electrical contact in a switch or controller electric equipment has a phenomenon of discharging and thus generates an electric arc while the electrical contact is turned from on to off. The generated electric arc will delay the breaking of the circuit, and even burn the electrical contacts, thereby causing the electrical contacts to fuse. In more severe cases, the switch will burn and explode. Therefore, an arc extinguishing device needs to be designed to achieve efficient and reliable arc extinguishing.

In the related art, a common switch device, such as a high-voltage direct current relay, usually uses sealed inflated air and an additional magnetic field to laterally elongate a metal phase electric arc, and thus the electric arc is rapidly cooled, recombined and deionized in an arc extinguishing medium. This arrangement is effective in arc extinguishing but quite complicated in manufacturing, thereby increasing the cost.

There is another method for extinguishing arcs, in which a strong magnetic field in the air medium is used. Since the electric arc may be strongly ionized in the air medium, this kind of method is not ideal in extinguishing the arc, may easily cause contacts to be fused, and requires sufficient internal space, preventing miniaturization of the switching device.

SUMMARY

A relay includes a housing, an electric contact system in the housing, an electromagnetic system in the housing, and a magnetic blowing arc-extinguish device. The electric contact system includes a static contact with a static contact portion and a movable contact with a movable contact portion. The electromagnetic system is configured to drive the movable contact to move between a closed position in which the movable contact is in electrical contact with the static contact and an opened position in which the movable contact is separated from the static contact. The magnetic blowing arc-extinguish device includes a permanent magnet statically provided near the static contact and configured to lengthen an electric arc between the static contact portion and the movable contact portion by an electromagnetic force to extinguish the electric arc.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
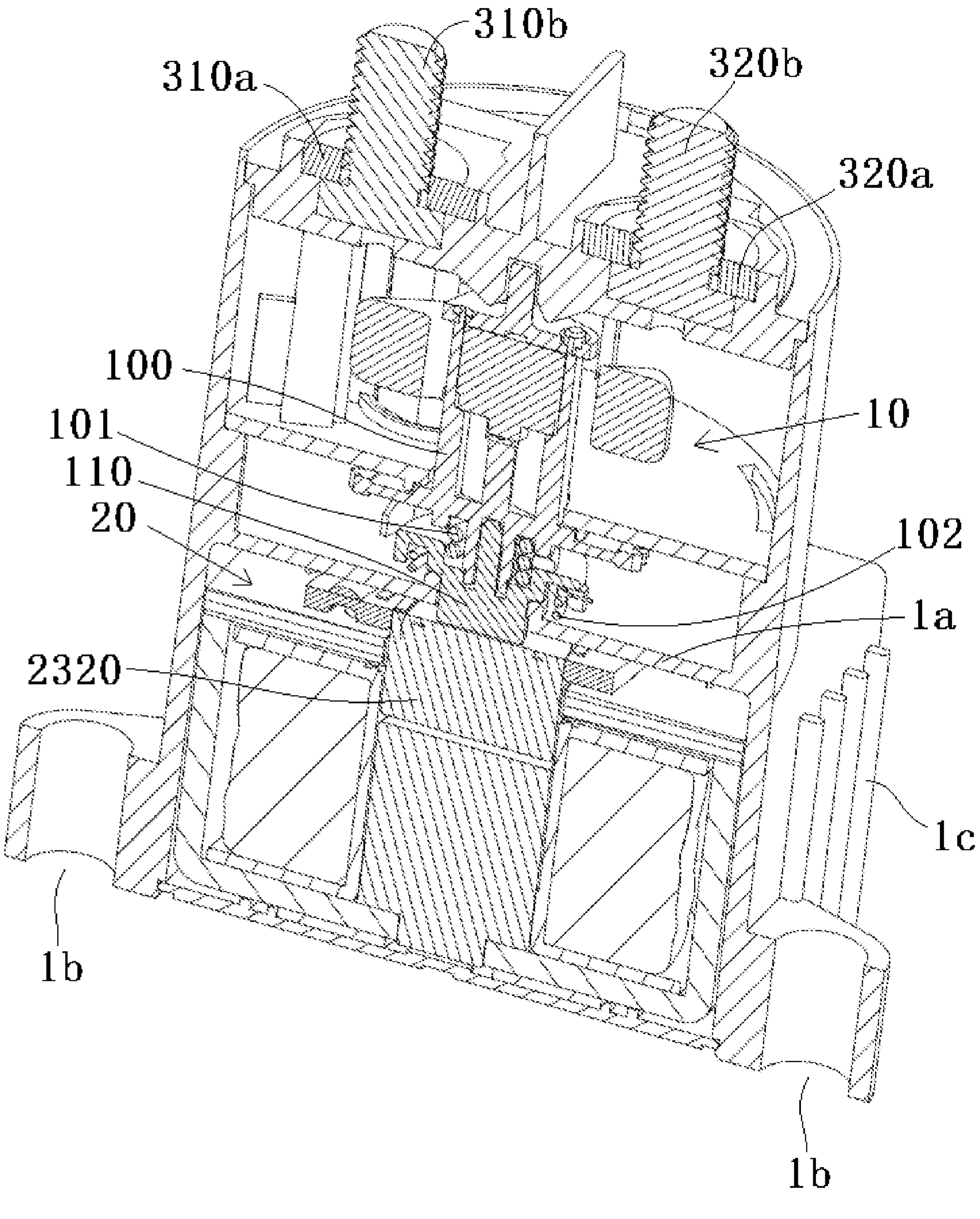
FIG. 1 is a sectional perspective view of a relay according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
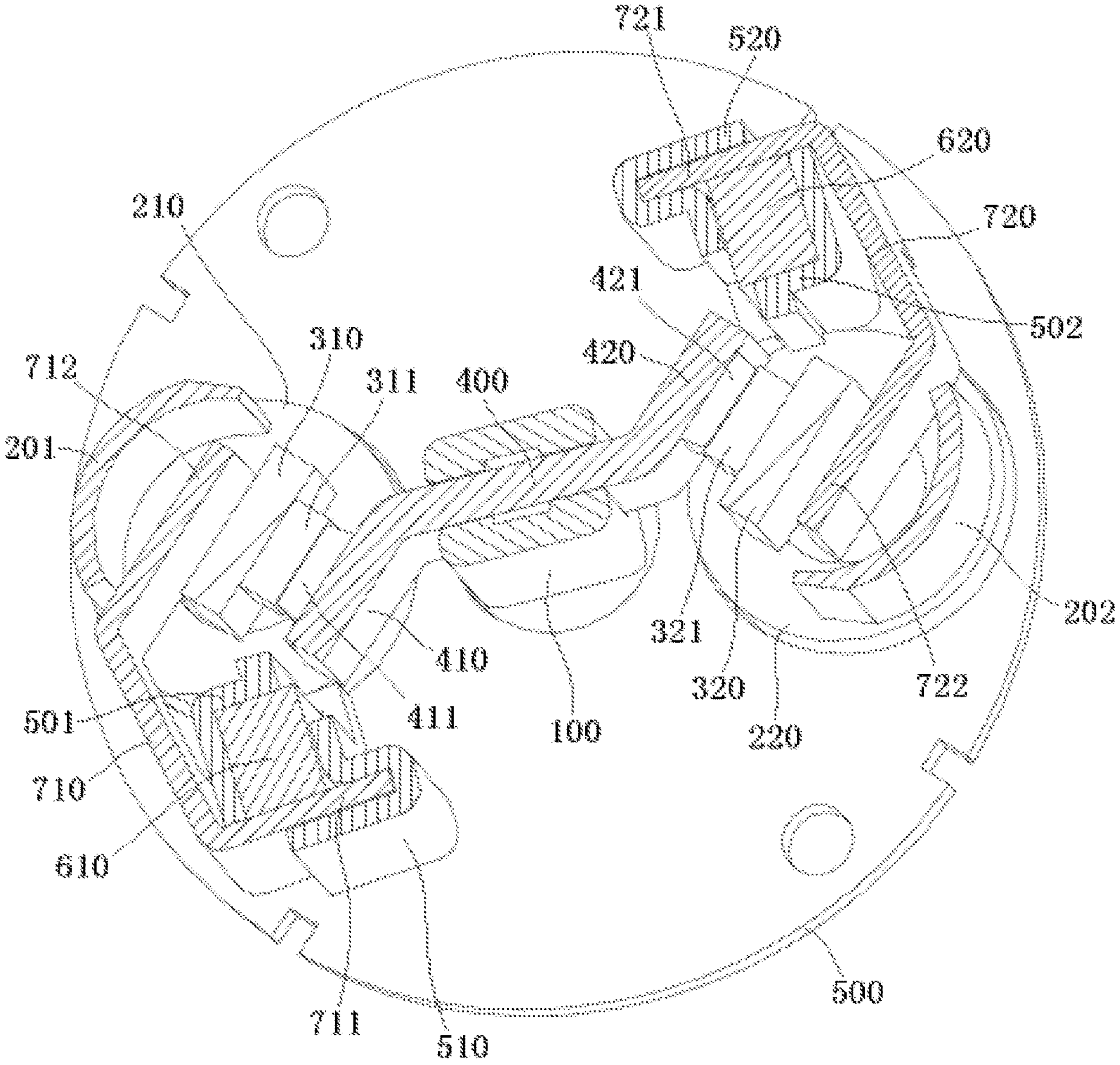
FIG. 2 is a sectional perspective view of an electric contact system of the relay in which a movable contact is in contact with a pair of static contacts.

A relay according to an embodiment, as shown in FIGS. 1 and 2, comprises a housing 1, an electric contact system 10, and an electromagnetic system 20. The electric contact system 10 is provided in the housing 1 and includes a static contact 310, 320 with a static contact portion 311, 321 and a movable contact 400 with a movable contact portion 411, 421. The electromagnetic system 20 is provided in the housing 1 and configured to drive the movable contact 400 to move between a closed position where the movable contact 400 is in electrical contact with the static contact 310, 320 and an opened position where the movable contact 400 is separated from the static contact 310, 320.

Figure 3:
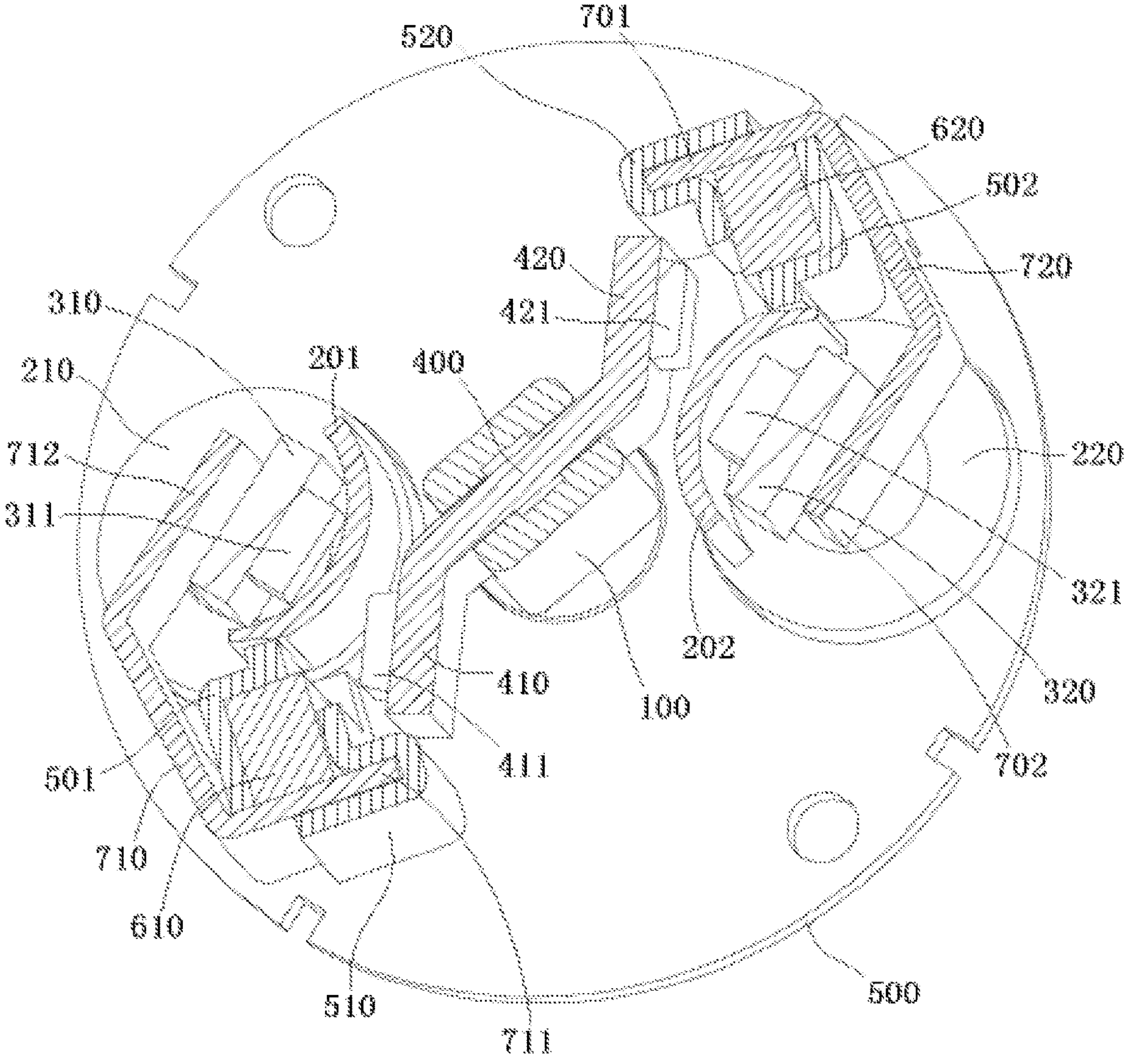
FIG. 3 is a sectional perspective view of the electric contact system of the relay in which the movable contact is separated from the pair of static contacts.

As shown in FIGS. 1-3, in an embodiment, the electric contact system 10 further comprises a rotating member 100. The movable contact 400 is mounted on the rotating member 100 and may be rotated with the rotating member 100 between the closed position (shown in FIG. 2) and the opened position (shown in FIG. 3). As shown in FIG. 2, when the movable contact 400 is rotated to the closed position, the movable contact 400 is in electrical contact with the static contact 310, 320. As shown in FIG. 3, when the movable contact 400 is rotated to the opened position, the movable contact 400 is separated from the static contact 310, 320.

As shown in FIGS. 2-3, in an embodiment, the electric contact system 10 further comprises a magnetic blowing arc-extinguish device 610, 620, 710, 720 comprising a permanent magnet 610, 620. The permanent magnet 610, 620 is statically provided near the static contact 310, 320 and configured to lengthen an electric arc between the static contact portion 311, 321 and the movable contact portion 411, 421 by an electromagnetic force to extinguish the electric arc.

As shown in FIGS. 2-3, in an embodiment, the electric contact system 10 further comprises an isolation arc-extinguish device 210, 220 adapted to push the electric arc toward the permanent magnet 610, 620, so as to force the electric arc to move to the vicinity of the permanent magnet 610, 620 and improve an effect of magnetic blowing arc-extinguish.

As shown in FIGS. 2-3, in an embodiment, the magnetic blowing arc-extinguish device 610, 710, 620, 720 further comprises a magnetic yoke 710, 720. The permanent magnet 610, 620 and the static contact 310, 320 are disposed in an accommodation space surrounded by the magnetic yoke 710, 720, so as to reduce magnetic leakage and increase an intensity of electromagnetic induction in the accommodation space.

As shown in FIGS. 2-3, in an embodiment, the isolation arc-extinguish device 210, 220 has an arc-extinguishing sheet 201, 202, and is meshed with the rotating member 100. The isolation arc-extinguish device 210, 220 is rotated by the rotating member 100.

As shown in FIG. 2, in an embodiment, when the movable contact 400 is rotated to the closed position, the arc-extinguishing sheet 201, 202 is rotated out of a contact region of the movable contact portion 411, 421 and the static contact portion 311, 321, so as to allow the movable contact portion 411, 421 to bring into electrical contact with the static contact portion 311, 321.

As shown in FIG. 3, in an embodiment, when the movable contact 400 is rotated to the opened position, the arc-extinguishing sheet 201, 202 is rotated into the contact region of the movable contact portion 411, 421 and the static contact portion 311, 321, so as to electrically isolate the movable contact portion 411, 421 from the static contact portion 311, 321 and cut off the electric arc.

As shown in FIGS. 2 and 3, in an embodiment, while the movable contact 400 is rotated from the connected position toward the opened position, the arc-extinguishing sheet 201, 202 pushes the electric arc toward the permanent magnet 610, 620, so as to force the electric arc to move to the vicinity of the permanent magnet 610, 620 and improve the effect of magnetic blowing arc-extinguish.

As shown in FIGS. 2 and 3, in an embodiment, the electric contact system 10 further comprises a static insulation isolating wall 501, 502. When the movable contact 400 is rotated to the opened position, the static insulation isolating wall 501, 502 and the arc-extinguishing sheet 201, 202 bring into contact with each other or only a slit is formed therebetween, so as to accelerate the cut-off of the electric arc.

As shown in FIGS. 2 and 3, in an embodiment, the electric contact system 10 further comprises an insulation base 500. The insulation isolating wall 501, 502 is formed on the insulation base 500. The rotating member 100 and the isolation arc-extinguish device 210, 220 are rotatably mounted on the insulation base 500.

As shown in FIGS. 2 and 3, in an embodiment, an insulation fixing wall 510, 520 is formed on the insulation base 500. The magnetic yoke 710, 720 and the permanent magnet 610, 620 are clamped and fixed between the insulation fixing wall 510, 520 and the insulation isolating wall 501, 502.

As shown in FIGS. 2 and 3, in an embodiment, one end 711, 721 of the magnetic yoke 710, 720 is inserted into a slot of the insulation fixing wall 510, 520, and the other end 712, 722 of the magnetic yoke 710, 720 is located at a side of the static contact 310, 320 that is opposite to the static contact portion 311, 321. The permanent magnet 610, 620 is embedded in a mounting chamber defined by the magnetic yoke 710, 720, the insulation fixing wall 510, 520 and the insulation isolating wall 501, 502.

As shown in FIGS. 2 and 3, in an embodiment, the static contact 310, 320 comprises a first static contact 310 and a second static contact 320, and the movable contact 400 is provided between the first static contact 310 and the second static contact 320. The first static contact 310 has a first static contact portion 311, and the second static contact 320 has a second static contact portion 321. A first end 410 of the movable contact 400 has a first movable contact portion 411 for being in electrical contact with the first static contact portion 311; and a second end 420 of the movable contact 400 has a second movable contact portion 421 for being in electrical contact with the second static contact portion 321.

As shown in FIGS. 2 and 3, in an embodiment, the magnetic blowing arc-extinguish device 610, 710, 620, 720 comprises a first magnetic blowing arc-extinguish device 610, 710 and a second magnetic blowing arc-extinguish device 620, 720. The first magnetic blowing arc-extinguish device 610, 710 comprises a first permanent magnet 610 statically disposed in the vicinity of the first static contact 310 to extinguish a first electric arc between the first static contact portion 311 and the first movable contact portion 411. The second magnetic blowing arc-extinguish device 620, 720 comprises a second permanent magnet 620 statically disposed in the vicinity of the second static contact 320 to extinguish a second electric arc between the second static contact portion 321 and the second movable contact portion 421.

As shown in FIGS. 2 and 3, in an embodiment, the first magnetic blowing arc-extinguish device 610, 710 further comprises a first magnetic yoke 710. The first permanent magnet 610 and the first static contact 310 are disposed in a first accommodation space surrounded by the first magnetic yoke 710, so as to reduce magnetic leakage and increase an intensity of electromagnetic induction in the first accommodation space. The second magnetic blowing arc-extinguish device 620, 720 further comprises a second magnetic yoke 720. The second permanent magnet 620 and the second static contact 320 are disposed in a second accommodation space surrounded by the second magnetic yoke 720, so as to reduce magnetic leakage and increase an intensity of electromagnetic induction in the second accommodation space.

As shown in FIGS. 2 and 3, in an embodiment, the isolation arc-extinguish device 210, 220 comprises a first isolation arc-extinguish device 210 and a second isolation arc-extinguish device 220. The first isolation arc-extinguish device 210 has a first arc-extinguishing sheet 201, and the second isolation arc-extinguish device 220 has a second arc-extinguishing sheet 202.

As shown in FIG. 3, in an embodiment, when the movable contact 400 is rotated to the opened position, the first arc-extinguishing sheet 201 is rotated into a contact region of the first movable contact portion 411 and the first static contact portion 311, so as to electrically isolate the first movable contact portion 411 from the first static contact portion 311 and cut off the first electric arc. As shown in FIG. 3, in an embodiment, when the movable contact 400 is rotated to the opened position, the second arc-extinguishing sheet 202 is rotated into a contact region of the second movable contact portion 421 and the second static contact portion 321, so as to electrically isolate the second movable contact portion 421 from the second static contact portion 321 and cut off the second electric arc.

As shown in FIGS. 2 and 3, in an embodiment, while the movable contact 400 is rotated from the closed position toward the opened position, the first arc-extinguishing sheet 201 pushes the first electric arc toward the first permanent magnet 610, so as to force the first electric arc to move to the vicinity of the first permanent magnet 610. As shown in FIGS. 2 and 3, in an embodiment, while the movable contact 400 is rotated from the closed position toward the opened position, the second arc-extinguishing sheet 202 pushes the second electric arc toward the second permanent magnet 620, so as to force the second electric arc to move to the vicinity of the second permanent magnet 620.

As shown in FIG. 2, in an embodiment, when the movable contact 400 is rotated to the closed position, the first arc-extinguishing sheet 201 is rotated out of the contact region of the first movable contact portion 411 and the first static contact portion 311, so as to allow the first movable contact portion 411 to bring into electrical contact with the first static contact portion 311. As shown in FIG. 2, in an embodiment, when the movable contact 400 is rotated to the closed position, the second arc-extinguishing sheet 202 is rotated out of the contact region of the second movable contact portion 421 and the second static contact portion 321, so as to allow the second movable contact portion 421 to bring into electrical contact with the second static contact portion 321.

As shown in FIGS. 2 and 3, in an embodiment, the insulation isolating wall 501, 502 comprises a first insulation isolating wall 501 and a second insulation isolating wall 502. As shown in FIG. 3, in an embodiment, when the movable contact 400 is rotated to the opened position, the first arc-extinguishing sheet 201 and the first insulation isolating wall 501 are in contact with each other or only a slit is formed therebetween, so as to accelerate the cut-off of the first electric arc. As shown in FIG. 3, in an embodiment, when the movable contact 400 is rotated to the opened position, the second arc-extinguishing sheet 202 and the second insulation isolating wall 502 are in contact with each other or only a slit is formed therebetween, so as to accelerate the cut-off of the second electric arc.

As shown in FIGS. 2 and 3, in an embodiment, the insulation fixing wall 510, 520 comprises a first insulation fixing wall 510 and a second insulation fixing wall 520. The first magnetic yoke 710 and the first permanent magnet 610 are clamped and fixed between the first insulation fixing wall 510 and the first insulation isolating wall 501. The second magnetic yoke 720 and the second permanent magnet 620 are clamped and fixed between the second insulation fixing wall 520 and the second insulation isolating wall 502.

As shown in FIGS. 2 and 3, in an embodiment, one end 711 of the first magnetic yoke 710 is inserted into a slot of the first insulation fixing wall 510, and the other end 712 of the first magnetic yoke 710 is located at a side of the first static contact 310 that is opposite to the first static contact portion 311. One end 721 of the second magnetic yoke 720 is inserted into a slot of the second insulation fixing wall 520, and the other end 722 of the second magnetic yoke 720 is located at a side of the second static contact 320 that is opposite to the second static contact portion 321. The first permanent magnet 610 is embedded in a first mounting chamber defined by the first magnetic yoke 710, the first insulation fixing wall 510 and the first insulation isolating wall 501. The second permanent magnet 620 is embedded in a second mounting chamber defined by the second magnetic yoke 720, the second insulation fixing wall 520 and the second insulation isolating wall 502.

In the aforementioned embodiments of the present disclosure, the arc-extinguishing sheet 201, 202 rapidly lengthens the electric arc and forces the electric arc to move to the vicinity of the permanent magnet 610, 620, increasing a magnetic blow-out path, while isolating an electric arc-generating path by the arc-extinguishing sheet 201, 202 and the insulation isolating wall 501, 502, effectively improving the effect of arc extinguishing, and greatly accelerating the speed of arc extinguishing.

As shown in FIG. 1, in an embodiment, a separation wall **1*a* is formed in the housing 1 to divide an inner space of the housing 1 into an upper space and a lower space. The electric contact system 10 is provided in the upper space of the housing 1, and the electromagnetic system 20 is provided in the lower space of the housing 1**.

As shown in FIGS. 1-3, in an embodiment, the electric contact system 10 further comprises a rotating seat 110 and a torsion spring 101. The rotating seat 110 is rotatably mounted on the separation wall **1*a*. Two ends of the torsion spring 101 are connected to the rotating seat 110 and the rotating member 100, respectively, so that the rotating seat 110 and the rotating member 100 are elastically connected together. The electromagnetic system 20 is adapted to drive the rotating seat 110 to rotate. The rotating seat 110 is adapted to drive the rotating member 100 to rotate by the torsion spring 101. The torsion spring 101 is adapted to apply a contact pressure between the movable contact portion 411, 412 and the static contact portion 311, 321**.

As shown in FIGS. 1-3, in an embodiment, the electric contact system 10 further comprises a reset spring 102. Two ends of the reset spring 102 are connected to the separation wall **1*a* and the rotating seat 110, respectively, so that the separation wall 1*a* and the rotating seat 110 are elastically connected together. When a torque applied on the rotating seat 110 by the electromagnetic system 20 is removed, the reset spring 102 drives the rotating seat 110 to its initial position, so that the movable contact 400** is rapidly rotated from the closed position to the opened position.

Figure 4:
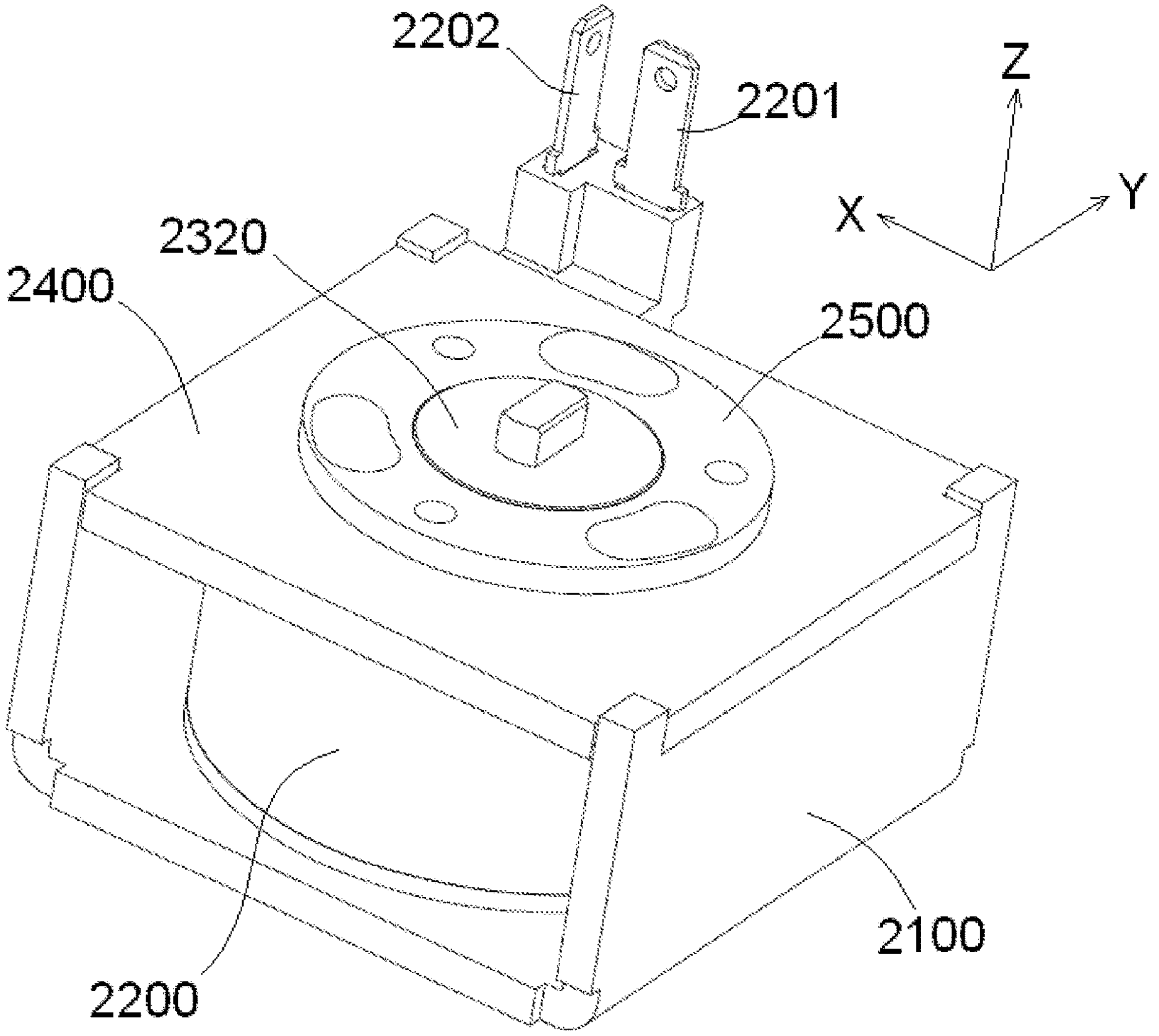
FIG. 4 is a perspective view of an electromagnetic system of the relay.
Figure 5:
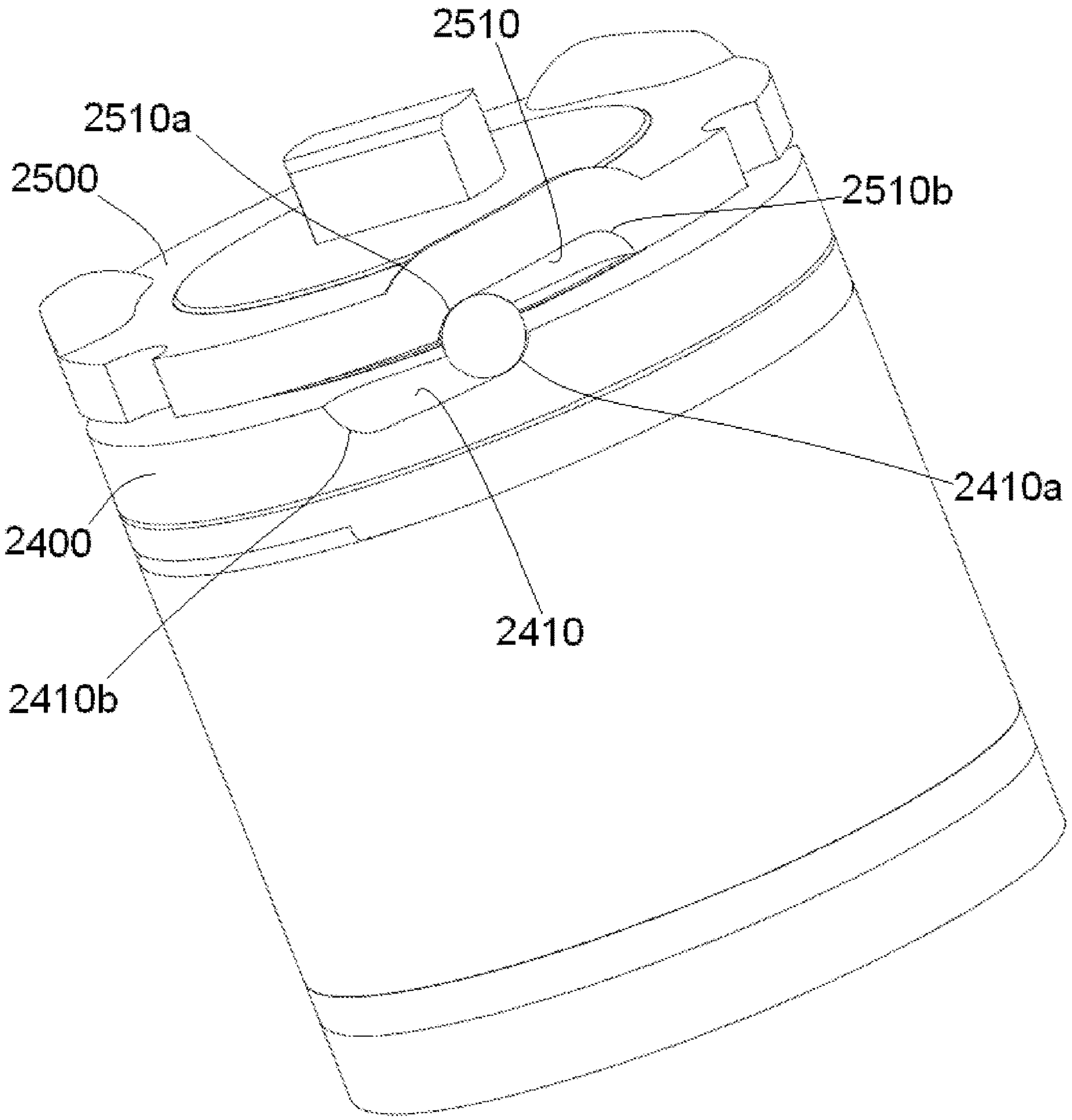
FIG. 5 is a perspective view of the electromagnetic system with a top plate and an armature cut away and a magnetic yoke removed.
Figure 7:
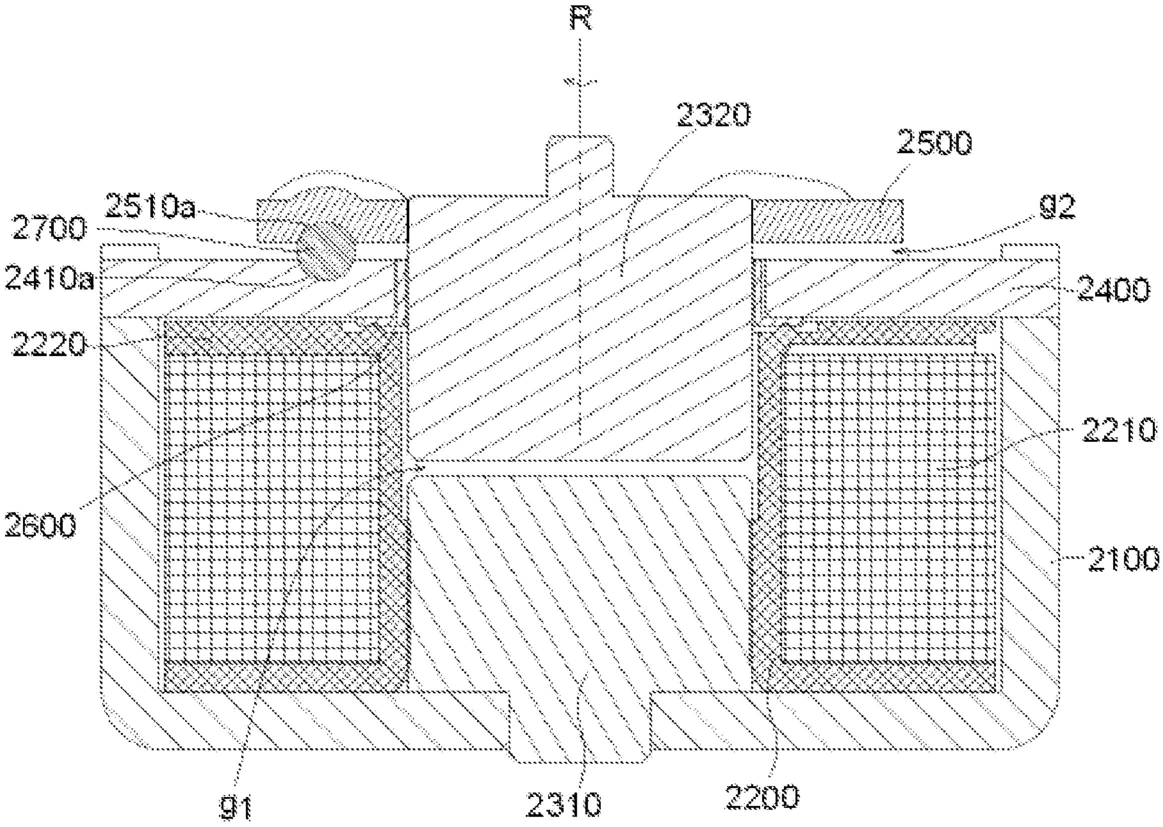
FIG. 7 is a sectional side view of the electromagnetic system with the armature in an initial position.

As shown in FIGS. 4-5 and 7, in an embodiment, the electromagnetic system 20 mainly comprises a magnetic yoke 2100, a coil 2200, a lower iron core 2310, a top plate 2400, an upper iron core 2320, an armature 2500, and a magnetic isolation ring 2600. The coil 2200 is mounted in the magnetic yoke 2100. The lower iron core 2310 is accommodated in a lower portion of the coil 2200 and fixed to the magnetic yoke 2100. The top plate 2400 is located above the coil 2200 and fixed to the magnetic yoke 2100. The upper iron core 2320 has a lower portion which is accommodated in the coil 2200 and an upper portion which passes through the top plate 2400. The armature 2500 is located above the top plate 2400 and fixedly connected to the upper iron core 2320. The magnetic isolation ring 2600 is disposed between the upper iron core 2320 and the top plate 2400 to electromagnetically isolate the upper core 2320 from the top plate 2400.

The upper iron core 2320 is configured to be movable in a vertical direction Z with respect to the magnetic isolation ring 2600. A central axis R of the upper iron core 2320 is parallel to the vertical direction Z. The upper iron core 2320 is rotatable about its central axis R. The upper iron core 2320 is connected to the rotating seat 110, so as to drive the rotating seat 110 to rotate.

As shown in FIGS. 5 and 7, in an embodiment, a plurality of first curved grooves 2510 are formed in a bottom surface of the armature 2500. A plurality of second curved grooves 2410, mated with the plurality of first curved grooves 2510 respectively, are formed in a top surface of the top plate

2400. The plurality of first curved grooves 2510 are evenly spaced around the central axis R of the upper iron core 2320. A ball 2700 is provided in each first curved groove 2510. The ball 2700 is configured to roll in the first curved groove 2510 and the mating second curved groove 2410.

As shown in FIGS. 4-8, in an embodiment, each first curved groove 2510 has a depth gradually deepened from a first end 2510*a* to a second end 2510*b* thereof, such that a force F applied on the armature 2500 by the ball 2700 is inclined to the central axis R of the upper iron core 2320 to drive the armature 2500 to rotate around the central axis R. Thereby, as clearly shown in FIG. 6, the force F applied to the armature 500 by the ball 700 may be decomposed into a first component force F1 parallel to the central axis R of the upper iron core 2320 and a second component force F2 perpendicular to the central axis R of the upper iron core 2320. As a result, the second component force F2 may drive the armature 500 to rotate around the central axis R.

Figure 8:
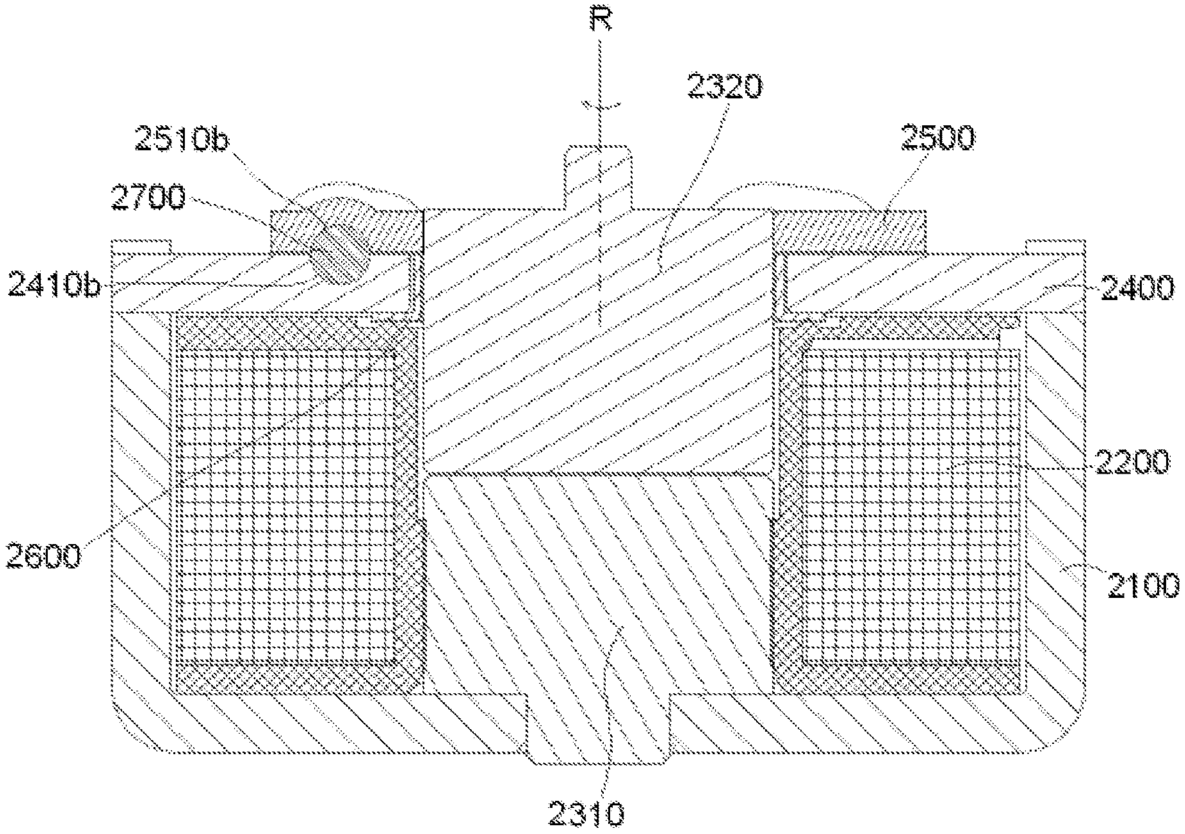
FIG. 8 is a sectional side view of the electromagnetic system with the armature in a final position.

In an exemplary embodiment of the present disclosure, the armature 2500 is movable between an initial position (the position shown in FIG. 7) and a final position (the position shown in FIG. 8). When the armature 2500 is moved from the initial position shown in FIG. 7 to the final position shown in FIG. 8, the armature 2500 is moved downward for a predetermined distance in the vertical direction Z while rotating for a predetermined angle around the central axis R.

As shown in FIGS. 4-8, in an embodiment, when the armature 2500 is moved from the initial position shown in FIG. 7 to the final position shown in FIG. 8, the armature 2500 rotates around the central axis R for the predetermined angle which is equal to the sum of central angles of the first curved groove 2510 and the second curved groove 2410. That is, when the armature 2500 is moved from the initial position shown in FIG. 7 to the final position shown in FIG. 8, the armature 2500 rotates around the central axis R for an arc length which is equal to the sum of arc lengths of the first curved groove 2510 and the second curved groove 2410 in the circumferential direction of the upper iron core 2320.

Figure 6:
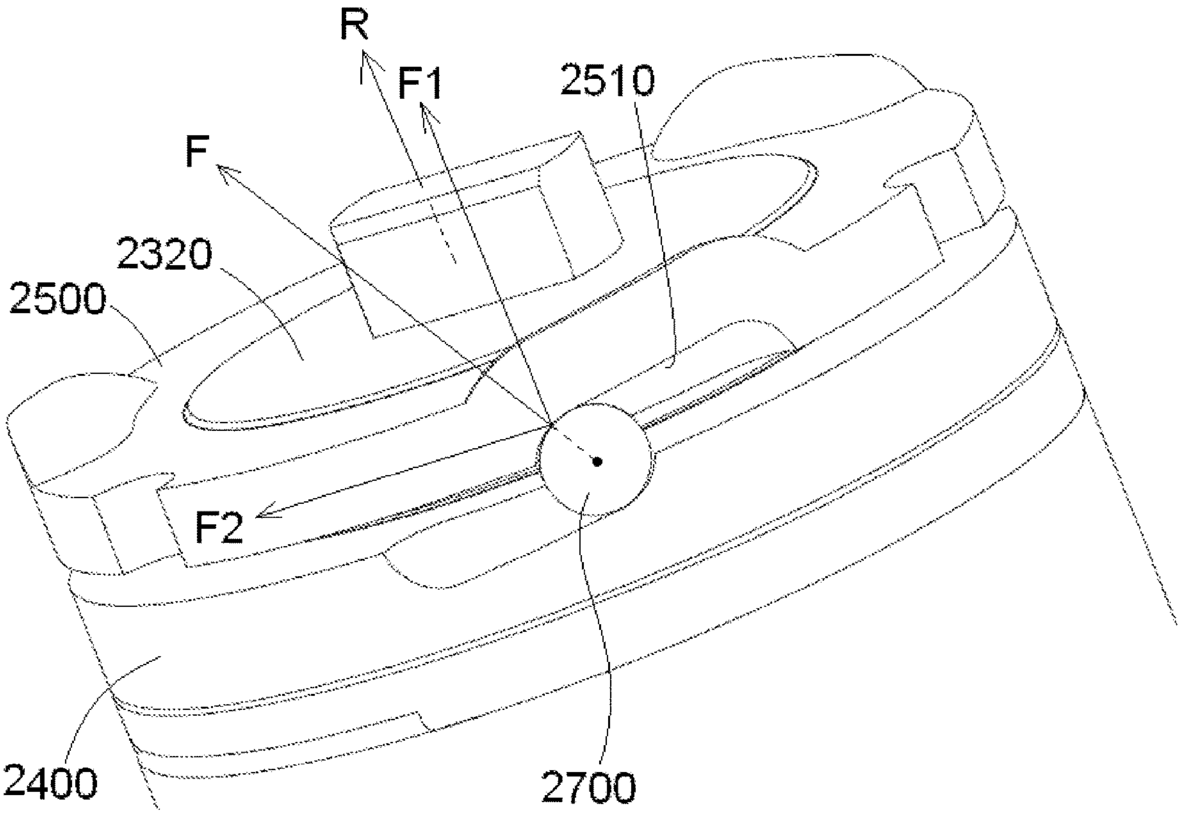
FIG. 6 is a perspective view of a force applied by a ball of the electromagnetic system on the armature.

In one embodiment of the present disclosure, when the armature 2500 is moved to the initial position shown in FIGS. 5-7, the ball 2700 is located in the first end 2510*a* of the first curved groove 2510. When the armature 2500 is moved to the final position shown in FIG. 8, the ball 2700 is located in the second end 2510*b* of the first curved groove 2510.

As shown in FIGS. 5-6, in an embodiment, each second curved groove 2410 has a depth gradually increasing from the first end 2410*a* to the second end 2410*b* thereof. As shown in FIG. 7, when the armature 2500 is moved to the initial position, the ball 2700 is located in the first end 2410*a* of the second curved groove 2410. As shown in FIG. 8, when the armature 2500 is moved to the final position, the ball 2700 is located in the second end 2410*b* of the second curved groove 2410.

As shown in FIGS. 5-6, in an embodiment, when the armature 2500 is moved to the initial position, the first end 2510*a* of the first curved groove 2510 and the first end 2410*a* of the second curved groove 2410 are adjacent to each other, while the second end 2510*b* of the first curved groove 2510 and the second end 2410*b* of the second curved groove 2410 are far away from each other. As shown in FIGS. 5-6, in an embodiment, when the armature 2500 is moved to the final position, the second end 2510*b* of the first curved groove 2510 and the second end 2410*b* of the second curved groove 2410 are adjacent to each other, while the first end 2510*a* of the first curved groove 2510 and the first end 2410*a* of the second curved groove 2410 are far away from each other.

As shown in FIG. 7, in an embodiment, a first air gap g1 is provided between the armature 2500 and the top plate 2400, and a second air gap g2 is provided between the upper iron core 2320 and the lower iron core 2310. As shown in FIGS. 5 and 7-8, in an embodiment, as the armature 2500 is moved from the initial position to the final position, the first air gap g1 and the second air gap g2 are decreased gradually. As the armature 2500 is moved from the final position to the initial position, the first air gap g1 and the second air gap g2 are increased gradually.

As shown in FIGS. 7-8, in an embodiment, the upper iron core 2320, the second air gap g2, the lower iron core 2310, the magnetic yoke 2100, the top plate 2400, the first air gap g1, and the armature 2500 are arranged to form a main magnetic circuit of the electromagnetic system 20.

As shown in FIG. 4, the coil 2200 has terminals 2201, 2202 adapted to be electrically connected to positive and negative electrodes of the power supply, respectively. When the coil 2200 is energized, the magnetic flux generated by the coil 2200 passes through the aforementioned main magnetic circuit. Due to the presence of the first air gap g1 and the second air gap g2, the lower iron core 2310 and the top plate 2400 respectively attract the upper iron core 2320 and the armature 2500 downward in the vertical direction Z, so that while the upper iron core 2320 and the armature 2500 are driven to move downward in the vertical direction Z, the upper iron core 2320 and the armature 2500 are rotating around the central axis R under the push of the balls 2700.

In one embodiment of the present disclosure, when the coil 2200 is energized, while the armature 2500 is moved from the initial position to the final position, the armature 2500 drives the balls 2700 to roll to the second ends 2510*b*, 2410*b* of the first curved groove 2510 and the second curved groove 2410 due to friction. When the armature 2500 is moved to the final position, the coil 2200 is de-energized so that the armature 2500 may be moved from the final position to the initial position by the return spring.

In the embodiment shown in FIGS. 7-8, when the coil 2200 is de-energized, the residual magnetic flux rapidly decreases due to the presence of the second air gap g2, and the armature 2500 will be quickly returned to the initial position by the return spring. At the same time, due to friction, the armature 2500 drives the balls 2700 to roll to the first ends 2510*a* and 2410*a* of the first curved groove 2510 and the second curved groove 2410.

In an exemplary embodiment of the present disclosure, the aforementioned ball 2700 may be a spherical ball or a cylindrical ball.

As shown in FIG. 7, in an embodiment, the coil 2200 includes a support frame 2220 and a wire 2210 wound on the support frame 2220. The upper iron core 2320 and the lower iron core 2310 are disposed in a hollow accommodation space of the support frame 2220 of the coil 2200, and the magnetic isolation ring 2600 is supported on the upper end surface of the support frame 2220 of the coil 2200.

In the foregoing exemplary embodiments of the present disclosure, the armature 2500 is provided with first curved grooves 2510, and the first curved groove 2510 is provided with a ball 2700. The depth of the first curved groove 2510 is deepened gradually from the first end 2510*a* to the second end 2510*b* thereof. Therefore, when the armature 2500 is moved downward in the vertical direction Z by the electromagnetic attraction force, the direction of the force applied by the balls 2700 on the armature 2500 is inclined to the vertical direction Z, so that the armature 2500 is driven to rotate. The electromagnetic system of the present disclosure may have larger torque and higher efficiency with the same size. In addition, the electromagnetic system of the present disclosure has a simple structure and a very low manufacturing cost.

As shown in FIG. 1, in an embodiment, air-cooling fins 1*c* are formed on an outer wall of the housing 1 to improve the heat dissipation performance of the relay and prevent the electromagnetic system 20 from overheating.

In an embodiment, the relay may further comprise a detection module adapted to detect a position of the movable contact 400. The detection module may comprise a detection circuit, and a movable terminal and a static terminal which are mounted on the housing 1. A pushing portion may be formed on the rotating member 100, the pushing portion is adapted to drive the movable terminal to move between a first position in electrical contact with the static terminal and a second position separated from the static terminal. When the movable contact 400 is rotated to the closed position, the pushing portion drives the movable terminal to the first position in electrical contact with the static terminal, so that the detection circuit is connected. In this way, if the detection circuit is connected, the movable contact 400 may be judged to be in the closed position. When the movable contact 400 is rotated to the opened position, the pushing portion drives the movable terminal to the second position separated from the static terminal, so that the detection circuit is disconnected. In this way, if the detection circuit is disconnected, the movable contact 400 may be judged to be in the opened position.

As shown in FIG. 1, in an embodiment, the static contact 310, 320 has a plate-like base 310*a*, 320*a* fixed on a top cover of the housing 1. The electromagnetic system 20 further comprises a bolt 310*b*, 320*b* electrically connected to the base 310*a*, 320*a* of the static contact 310, 320. The bolt 310*b*, 320*b* is adapted to electrically connect the static contact 310, 320 to a power supply wire of an electric equipment. A contact area between static contact 310, 320 and the housing 1 may be increased by the plate-like base 310*a*, 320*a* and the bolt 310, 320*b*, thus the heat dissipation area of static contact 310, 320 may be increased.

As shown in FIG. 1, in an embodiment, an installation hole 1*b* for mounting the relay to the electric equipment is formed in a bottom portion or a side portion of the housing 1.

In an exemplary embodiment of the present disclosure, the relay may be a high voltage direct current relay.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle. Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A relay, comprising:

a housing including a plurality of air-cooling fins formed on an outer wall thereof;

an electric contact system in the housing, the electric contact system including a static contact with a static contact portion and a movable contact with a movable contact portion;

an electromagnetic system in the housing, the electromagnetic system is configured to drive the movable contact to move between a closed position in which the movable contact is in electrical contact with the static contact and an opened position in which the movable contact is separated from the static contact; and a magnetic blowing arc-extinguish device including a permanent magnet statically provided near the static contact and configured to lengthen an electric arc between the static contact portion and the movable contact portion by an electromagnetic force to extinguish the electric arc.

2. The relay of claim 1, wherein the electric contact system includes an isolation arc-extinguish device adapted to push the electric arc toward the permanent magnet and force the electric arc to move to a vicinity of the permanent magnet.

3. The relay of claim 2, wherein the electric contact system includes a rotating member on which the movable contact is mounted, the electromagnetic system is adapted to drive the rotating member to rotate and drive the movable contact to rotate between the closed position and the opened position.

4. The relay of claim 3, wherein the magnetic blowing arc-extinguish device includes a magnetic yoke, the permanent magnet and the static contact are disposed in an accommodation space surrounded by the magnetic yoke.

5. The relay of claim 4, wherein the isolation arc-extinguish device has an arc-extinguishing sheet and is meshed with the rotating member, the isolation arc-extinguish device is rotated by the rotating member, the arc-extinguishing sheet is rotated out of a contact region of the movable contact portion and the static contact portion when the movable contact is rotated to the closed position to allow the movable contact portion to electrically contact the static contact portion, and the arc-extinguishing sheet is rotated into the contact region when the movable contact is rotated to the opened position to electrically isolate the movable contact portion from the static contact portion and cut off the electric arc.

6. The relay of claim 5, wherein, while the movable contact is rotated from the closed position toward the opened position, the arc-extinguishing sheet pushes the electric arc toward the permanent magnet to force the electric arc to move to the vicinity of the permanent magnet.

7. The relay of claim 3, wherein the housing has a separation wall dividing an inner space of the housing into an upper space and a lower space, the electric contact system provided in the upper space of the housing and the electromagnetic system provided in the lower space of the housing.

8. The relay of claim 7, wherein the electric contact system includes a rotating seat and a torsion spring, the rotating seat is rotatably mounted on the separation wall, a pair of ends of the torsion spring are connected to the rotating seat and the rotating member, respectively, so that the rotating seat and the rotating member are elastically connected together, the electromagnetic system drives the rotating seat to rotate, the rotating seat drives the rotating member to rotate by the torsion spring, and the torsion spring applies a contact pressure between the movable contact portion and the static contact portion.

9. The relay of claim 8, wherein the electric contact system includes a reset spring, a pair of ends of the reset spring are connected to the separation wall and the rotating seat, respectively, so that the separation wall and the rotating seat are elastically connected together, and when a torque applied on the rotating seat by the electromagnetic system is removed, the reset spring drives the rotating seat to an initial position, so that the movable contact is rapidly rotated from the closed position to the opened position.

10. The relay of claim 9, wherein the electromagnetic system includes a magnetic yoke, a coil mounted in the magnetic yoke, a lower iron core accommodated in a lower portion of the coil and fixed to the magnetic yoke, a top plate located above the coil and fixed to the magnetic yoke, an upper iron core having a lower portion which is accommodated in the coil and an upper portion which passes through the top plate, an armature located above the top plate and fixedly connected to the upper iron core, and a magnetic isolation ring disposed between the upper iron core and the top plate, the upper iron core is rotatable about a central axis thereof and connected to the rotating seat, so as to drive the rotating seat to rotate.

11. The relay of claim 10, wherein the upper iron core is movable in a vertical direction with respect to the magnetic isolation ring, and the central axis of the upper iron core is parallel to the vertical direction.

12. The relay of claim 11, wherein a plurality of first curved grooves are formed in a bottom surface of the armature and a plurality of second curved grooves, mated with the plurality of first curved grooves, respectively, are formed in a top surface of the top plate, the plurality of first curved grooves are evenly spaced around the central axis of the upper iron core, a plurality of balls each roll in one of the first curved grooves and one of the second curved grooves, each first curved groove has a depth gradually deepened from a first end to a second end, a force applied on the armature by the ball is inclined to the central axis of the upper iron core to drive the armature to rotate around the central axis.

13. The relay of claim 12, wherein the armature is movable between an initial position and a final position, and as the armature is moved from the initial position to the final position, the armature is moved downward for a predetermined distance in the vertical direction and rotates for a predetermined angle around the central axis.

14. The relay of claim 13, wherein the predetermined angle is equal to a sum of a central angle of the first curved groove and a central angle of the second curved groove.

15. The relay of claim 13, wherein, when the armature is moved to the initial position, the ball is located in the first end of the first curved groove, and when the armature is moved to the final position, the ball is located in the second end of the first curved groove.

16. The relay of claim 15, wherein each second curved groove has a depth gradually deepened from a first end to a second end, and when the armature is moved to the initial position, the ball is located in the first end of the second curved groove, and when the armature is moved to the final position, the ball is located in the second end of the second curved groove.

17. The relay of claim 16, wherein, when the armature is moved to the initial position, the first end of the first curved groove and the first end of the second curved groove are adjacent to each other, while the second end of the first curved groove and the second end of the second curved groove are far away from each other, and when the armature is moved to the final position, the second end of the first curved groove and the second end of the second curved groove are adjacent to each other, while the first end of the first curved groove and the first end of the second curved groove are far away from each other.

18. The relay of claim 17, wherein a first air gap is provided between the armature and the top plate and a second air gap is provided between the upper iron core and the lower iron core, wherein, as the armature is moved from the initial position to the final position, the first air gap and the second air gap are decreased gradually, and as the armature is moved from the final position to the initial position, the first air gap and the second air gap are increased gradually.

19. The relay of claim 18, wherein the upper iron core, the second air gap, the lower iron core, the magnetic yoke, the top plate, the first air gap, and the armature are arranged to form a main magnetic circuit of the electromagnetic system, wherein, when the coil is energized, the magnetic flux generated by the coil passes through the main magnetic circuit such that the lower iron core and the top plate attract the upper iron core and the armature downward in the vertical direction to drive the upper iron core and the armature to move downward in the vertical direction and rotate around the central axis under the push of the balls.

20. The relay of claim 19, wherein, when the coil is energized, the armature is moved from the initial position to the final position, and the coil is de-energized when the armature is moved to the final position, so that the armature is moved from the final position to the initial position by a return spring.

21. The relay of claim 10, wherein the coil includes a support frame and a wire wound on the support frame.

22. The relay of claim 21, wherein the upper iron core and the lower iron core are disposed in a hollow accommodation space of the support frame, and the magnetic isolation ring is supported on an upper end surface of the support frame.

23. The relay of claim 1, further comprising a detection module adapted to detect a position of the movable contact and including a detection circuit, a movable terminal, and a static terminal mounted on the housing, a pushing portion is formed on the rotating member and adapted to drive the movable terminal to move between a first position in electrical contact with the static terminal and a second position separated from the static terminal, when the movable contact is rotated to the closed position, the pushing portion drives the movable terminal to the first position in electrical contact with the static terminal, so that the detection circuit is connected, and when the movable contact is rotated to the opened position, the pushing portion drives the movable terminal to the second position separated from the static terminal, so that the detection circuit is disconnected.

24. The relay of claim 1, wherein the static contact has a plate-like base fixed on a top cover of the housing, the electromagnetic system includes a bolt electrically connected to a base of the static contact, the bolt being adapted to electrically connect the static contact to a power supply wire of an electric equipment.

25. A relay, comprising:

a housing;

an electric contact system arranged in the housing, including:

- a static contact with a static contact portion;
- a movable contact with a movable contact portion; and
- a rotating member on which the movable contact is mounted;

an electromagnetic system arranged in the housing and adapted to drive the rotating member to rotate and drive the movable contact to move between a closed position in which the movable contact is in electrical contact with the static contact and an opened position in which the movable contact is separated from the static contact;

a magnetic blowing arc-extinguish device, including:

a permanent magnet statically provided near the static contact and adapted to lengthen an electric arc between the static contact portion and the movable contact portion by an electromagnetic force to extinguish the electric arc; and a magnetic yoke, the permanent magnet and the static contact are disposed in an accommodation space surrounded by the magnetic yoke; and an isolation arc-extinguish device adapted to push the electric arc toward the permanent magnet and force the electric arc to move to a vicinity of the permanent magnet, the isolation arc-extinguish device including an arc-extinguishing sheet and is meshed with the rotating member, the isolation arc-extinguish device is rotated by the rotating member, the arc-extinguishing sheet is rotated out of a contact region of the movable contact portion and the static contact portion when the movable contact is rotated to the closed position to allow the movable contact portion to electrically contact the static contact portion, and the arc-extinguishing sheet is rotated into the contact region when the movable contact is rotated to the opened position to electrically isolate the movable contact portion from the static contact portion and cut off the electric arc, wherein, while the movable contact is rotated from the closed position toward the opened position, the arc-extinguishing sheet pushes the electric arc toward the permanent magnet to force the electric arc to move to the vicinity of the permanent magnet.

26. The relay of claim 25, wherein the electric contact system includes a static insulation isolating wall, the static insulation isolating wall and the arc-extinguishing sheet are in contact with each other or only a slit is formed therebetween when the movable contact is rotated to the opened position.

27. The relay of claim 26, wherein the electric contact system includes an insulation base on which the insulation isolating wall is formed and the rotating member and the isolation arc-extinguish device are rotatably mounted.

28. The relay of claim 27, wherein the insulation base has an insulation fixing wall, the magnetic yoke and the permanent magnet are clamped and fixed between the insulation fixing wall and the insulation isolating wall.

29. The relay of claim 28, wherein a first end of the magnetic yoke is inserted into a slot of the insulation fixing wall and a second end of the magnetic yoke is located at a side of the static contact that is opposite to the static contact portion, the permanent magnet is embedded in a mounting chamber defined by the magnetic yoke, the insulation fixing wall, and the insulation isolating wall.

30. The relay of claim 29, wherein the static contact includes a first static contact and a second static contact, the movable contact is provided between the first static contact and the second static contact, the first static contact has a first static contact portion and the second static contact has a second static contact portion, a first end of the movable contact has a first movable contact portion for electrically contacting the first static contact portion and a second end of the movable contact has a second movable contact portion for electrically contacting the second static contact portion.

31. The relay of claim 30, wherein the magnetic blowing arc-extinguish device has a first magnetic blowing arc-extinguish device and a second magnetic blowing arc-extinguish device, the first magnetic blowing arc-extinguish device has a first permanent magnet statically disposed in a vicinity of the first static contact to extinguish a first electric arc between the first static contact portion and the first movable contact portion, and the second magnetic blowing arc-extinguish device has a second permanent magnet statically disposed in a vicinity of the second static contact to extinguish a second electric arc between the second static contact portion and the second movable contact portion.

32. The relay of claim 31, wherein the first magnetic blowing arc-extinguish device has a first magnetic yoke, the first permanent magnet and the first static contact are disposed in a first accommodation space surrounded by the first magnetic yoke, the second magnetic blowing arc-extinguish device has a second magnetic yoke, the second permanent magnet and the second static contact are disposed in a second accommodation space surrounded by the second magnetic yoke.

33. The relay of claim 32, wherein the isolation arc-extinguish device has a first isolation arc-extinguish device with a first arc-extinguishing sheet and a second isolation arc-extinguish device with a second arc-extinguishing sheet.

34. The relay of claim 33, wherein, when the movable contact is rotated to the opened position, the first arc-extinguishing sheet is rotated into a contact region of the first movable contact portion and the first static contact portion to electrically isolate the first movable contact portion from the first static contact portion and cut off the first electric arc, and when the movable contact is rotated to the opened position, the second arc-extinguishing sheet is rotated into a contact region of the second movable contact portion and the second static contact portion to electrically isolate the second movable contact portion from the second static contact portion and cut off the second electric arc.

35. The relay of claim 34, wherein, while the movable contact is rotated from the closed position toward the opened position, the first arc-extinguishing sheet pushes the first electric arc toward the first permanent magnet to force the first electric arc to move to the vicinity of the first permanent magnet, and while the movable contact is rotated from the closed position toward the opened position, the second arc-extinguishing sheet pushes the second electric arc toward the second permanent magnet to force the second electric arc to move to the vicinity of the second permanent magnet.

36. The relay of claim 35, wherein, when the movable contact is rotated to the closed position, the first arc-extinguishing sheet is rotated out of the contact region of the first movable contact portion and the first static contact portion to allow the first movable contact portion to electrically contact the first static contact portion, and when the movable contact is rotated to the closed position, the second arc-extinguishing sheet is rotated out of the contact region of the second movable contact portion and the second static contact portion to allow the second movable contact portion to electrically contact the second static contact portion.

37. The relay of claim 36, wherein the insulation isolating wall has a first insulation isolating wall and a second insulation isolating wall, when the movable contact is rotated to the opened position, the first arc-extinguishing sheet and the first insulation isolating wall are in contact with each other or only a slit is formed therebetween, and when the movable contact is rotated to the opened position, the second arc-extinguishing sheet and the second insulation isolating wall are in contact with each other or only a slit is formed therebetween.

38. The relay of claim 37, wherein the insulation fixing wall has a first insulation fixing wall and a second insulation fixing wall, the first magnetic yoke and the first permanent magnet are clamped and fixed between the first insulation fixing wall and the first insulation isolating wall, and the second magnetic yoke and the second permanent magnet are clamped and fixed between the second insulation fixing wall and the second insulation isolating wall.

39. The relay of claim 38, wherein a first end of the first magnetic yoke is inserted into a slot of the first insulation fixing wall and a second end of the first magnetic yoke is located at a side of the first static contact that is opposite to the first static contact portion, a first of the second magnetic yoke is inserted into a slot of the second insulation fixing wall and a second end of the second magnetic yoke is located at a side of the second static contact opposite to the second static contact portion, the first permanent magnet is embedded in a first mounting chamber defined by the first magnetic yoke, the first insulation fixing wall, and the first insulation isolating wall, and the second permanent magnet is embedded in a second mounting chamber defined by the second magnetic yoke, the second insulation fixing wall, and the second insulation isolating wall.

40. A relay, comprising:

an electric contact system including a static contact and a movable contact;

an electromagnetic system driving the movable contact to move between a closed position in which the movable contact is in electrical contact with the static contact and an opened position in which the movable contact is separated from the static contact;

a magnetic blowing arc-extinguish device including a permanent magnet arranged proximate the static contact; and an isolation arc-extinguish device including an arc-extinguishing sheet rotated by the electromagnetic system, the arc-extinguishing sheet is rotated out of a contact region of the movable contact and the static contact when the movable contact is rotated to the closed position, and the arc-extinguishing sheet is rotated in a direction toward the permanent magnet and into the contact region when the movable contact is rotated to the opened position.

41. The relay of claim 40, wherein, in the opened position, the arc-extinguishing sheet is positioned between the static contact and the permanent magnet.

42. The relay of claim 41, wherein:

the electric contact system further includes a static insulation isolating wall arranged at least partially between the static contact and the permanent magnet; and in the opened position, the arc-extinguishing sheet is positioned directly adjacent to the static insulation isolating wall.

43. The relay of claim 42, wherein the electric contact system further includes an insulation fixing wall, the permanent magnet arranged and fixed between the insulation fixing wall and the insulation isolating wall.

44. The relay of claim 42, wherein, in the opened position, the arc-extinguishing sheet contacts the static insulation isolating wall.

* * * * *